C. T. STARBUCK.
LIFTING JACK.
APPLICATION FILED MAY 13, 1912.

1,093,590.

Patented Apr. 14, 1914.
2 SHEETS—SHEET 2.

UNITED STATES PATENT OFFICE.

CALVIN T. STARBUCK, OF BIRMINGHAM, ALABAMA, ASSIGNOR TO A. O. NORTON, INCORPORATED.

LIFTING-JACK.

1,093,590.

Specification of Letters Patent. Patented Apr. 14, 1914.

Application filed May 13, 1912. Serial No. 696,969.

*To all whom it may concern:*

Be it known that I, CALVIN T. STARBUCK, a citizen of the United States of America, and resident of Birmingham, in the county of Jefferson and State of Alabama, have invented certain new and useful Improvements in Lifting-Jacks, of which the following is a specification.

This invention relates to lifting jacks and is designed primarily as an improvement on the patent which was issued to me September 6, 1910, numbered 969,215.

An object of this invention is to provide novel means for arresting the screw rotating means at the limit of the upward and downward movement of the screw, the said arresting means being so arranged as to prevent jamming or binding of the parts to such an extent as to impair the utility of the device.

A still further object of this invention is to provide novel means for rotating the screw, means being also provided for braking or arresting the movement of the screw driving means and the invention further has for its object the provision of novel means for guiding the balls in the race way to the screw threads of the jack.

With the foregoing and other objects in view, the invention consists in the details of construction and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
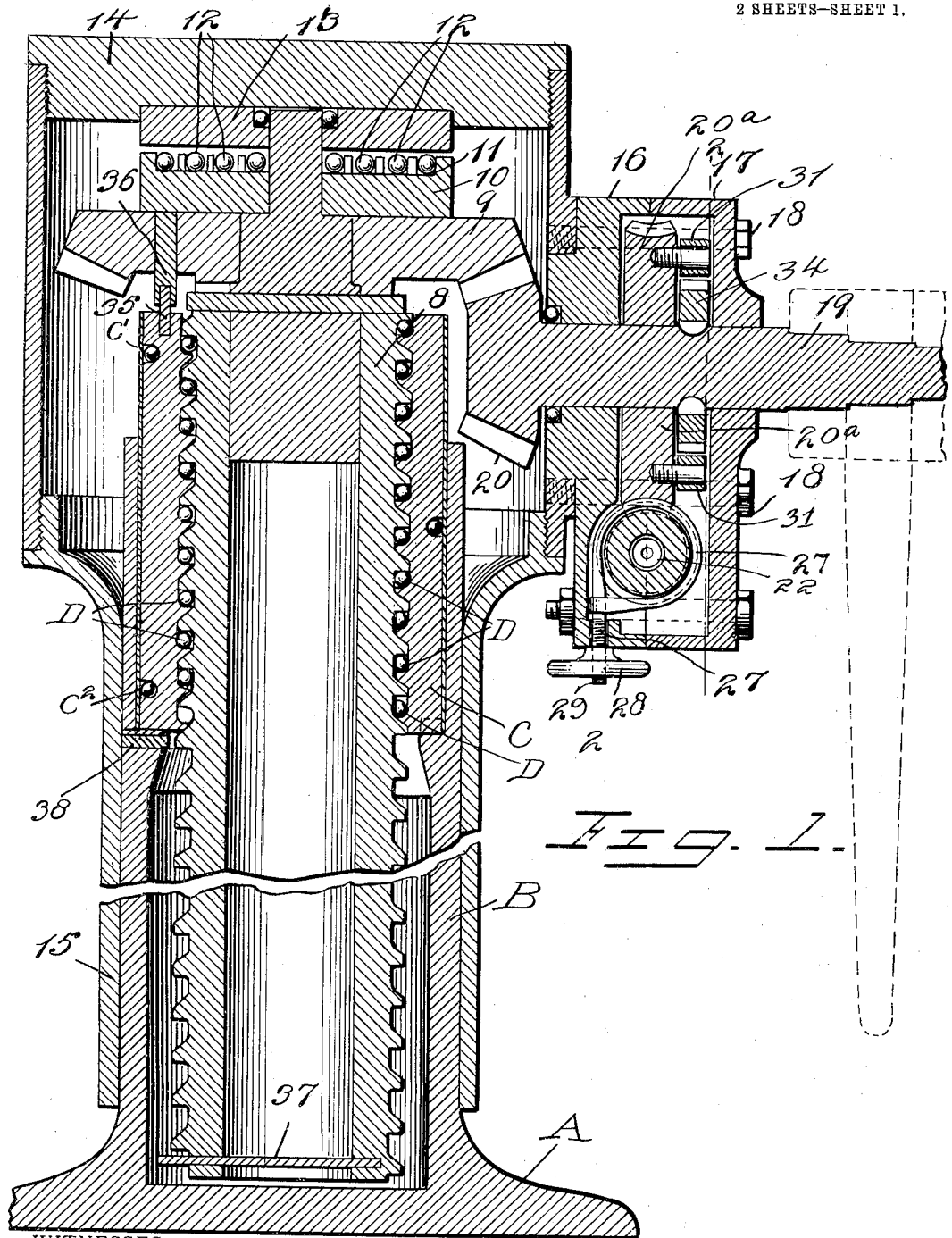
Figure 2:
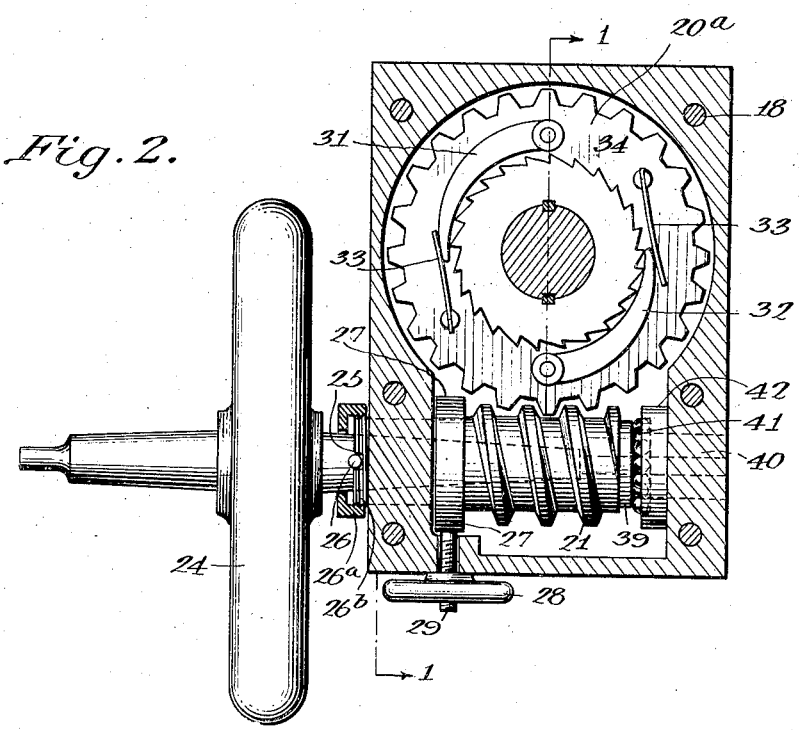
Figure 3:
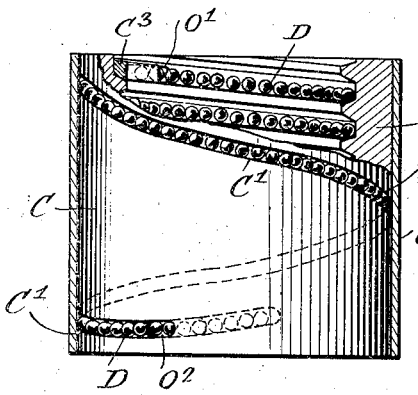
Figure 4:
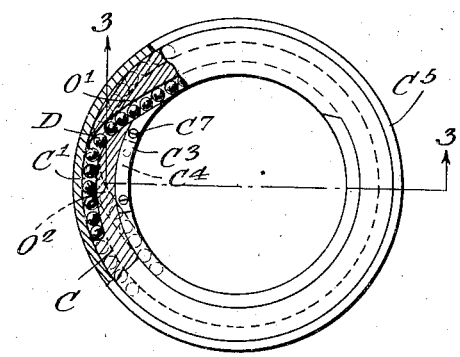

Figure 1 illustrates a vertical sectional view embodying the invention; Fig. 2 illustrates a sectional view on a line corresponding with the line 2—2 of Fig. 1; Figs. 3 and 4 illustrate details of the ball race and the means for guiding the balls therein.

In these drawings A denotes the base, B a casing having its upper end supporting a nut C. The nut C has a ball race therein which extends spirally of the nut and has two extensions $C'$ and $C^2$ communicating with the interior of the nut and adapted to convey the balls D which travel in the ball race into the space between the threads of the nut. The said extensions $C'$ and $C^2$ in the present invention have their walls cut away for the reception of the guide plates $C^3$ and $C^4$, the ends of the said guide plates being beveled as shown at $C^5$ and $C^6$ respectively, the said bevel being of an angle corresponding to the angle of the extensions with relation to a radius of the ball race, the said plates being secured to the nut by the screws $C^7$. By reason of the provision of the plates just described, the balls are guided to the threads from the ball race at one end of said ball race and from the ball race to the threads at the opposite end of said ball race, thus insuring proper travel of the balls and their delivery to the spaces formed by the threaded portion of the screw to be presently described.

Associated with the nut and coöperating therewith is a screw 8 having mounted thereon near its upper end a gear wheel 9 and a bearing plate 10 with ball races 11 therein to receive the balls 12, which balls support the plate 13 and the plate 13 has the head 14 connected to it. As the screw is moved vertically in the nut, the head 14 is raised or lowered according to the direction of rotation of the operating parts to be presently explained. A jacket 15 is slidable on the sleeve of the base A and is guided thereby as the screw is moved vertically and as the head elevated or lowered. The sleeve 15 is apertured at one side and the housing sections 16 and 17 are secured to the sleeve by means of the screws 18, the said housing sections each having an aperture therethrough for the reception of the shaft 19, which shaft is rotatable therein and is provided with a pinion 20 meshing with the gear wheel 9, so that as the shaft 19 is rotated, motion is communicated to the gear wheel and thence to the screw. The outer end of the shaft is reduced and adapted to receive a hand tool for rotating the shaft. As a further means for rotating the shaft 19, I provide a worm wheel $20^a$ which is rotatable on the shaft 19 and is driven by a worm 21 which is journaled in the housing sections and extends therethrough at right angles to the direction of the shaft 19. The worm $20^a$ has an axle bore or recess 22 forming a socket for the reception of the shank 23 of the operating wheel 24, the end of the said worm being provided with recesses 25 forming seats for the studs 26 projecting from the shanks of the operating wheel. I provide an anti-friction thrust bearing for one end of the worm, mounting a washer 39 on the reduced end 40 of the worm shaft and interposing a set of balls 41 between the washer and a ball race 42 which is made fast to the housing. The worm is provided with a brake band similar to that shown in my said Patent No. 969,215, and comprising a shank 29 threaded at one end and at the other flattened to form a brake band 27, the free end of which is slotted so that the shank 29 can be passed therethrough to form a loop. The threaded end of the shank 29 projects downwardly through a suitable opening in the housing and is engaged by a nut 27, by means of which it can be drawn down and the lining of leather or like material in the brake band loop tightened about the plane surface 30 of the shaft on which the worm is formed.

The worm wheel 20ª carries two spring pressed pawls 31 and 32 which pawls are pivoted to the side of the worm wheel and have their free ends pressed inwardly by means of the springs 33. A ratchet wheel 34 is mounted on the short shaft 19 and is in position to be engaged by the pawls 31 and 32 for the purpose of communicating motion of the worm wheel 20ª to the shaft 19 in order to rotate the shaft 19 step by step during the actuation of the hand wheel. These parts are designed so that power driven machinery can be readily applied to turn the worm and raise the jack.

As a means for arresting the rotation of the screw when the said screw has reached the limit of its upward or downward movement, I provide a post 35 which projects from the upper surface of the nut and I provide the gear wheel 9 with a depending post 36 which engages the post 35 when the screw has been lowered a predetermined distance; likewise, I provide a cross pin 37 near the bottom of the set screw which is adapted to abut the stud or pin 38 which projects from the inner wall of the casing when the screw has been elevated a predetermined distance; the said means for arresting the rotation of the screw being such as to prevent, as heretofore stated, undue frictional engagement or contact between the parts. An inspection of the drawing will show that the pawls 32 are alternately operative to actuate the ratchet wheel and that upon release of the brake band, the weight on the head of the screw will serve to cause the descent of the screw and the lowering of the load, the rapidity of descent being under the control of the operator through the medium of the brake which is applied to the worm.

The gearing, by means of which the shaft 19 turns the lifting screw, is such as is customarily used in high speed lifting jacks so that by means of a ratchet on the shaft 19, an operator can quickly raise the jack. The gearing, by means of which the brake is driven from the shaft 19, has high differential which greatly multiplies the speed of rotation of the shaft as imparted to the brake wheel or worm shaft so that but small frictional power need be applied at the brake and to arrest or control the descent of the jack. The worm and worm wheel shown are preferable as the speed multiplying gearing between the shaft and brake.

As the description of the operation of the apparatus has been stated in connection with the description of the several parts thereof, a further detailed description is believed to be unnecessary to an understanding of the invention by those skilled in the art.

I claim—

1. In a lifting jack, a base member, a nut supported by the base member, a screw member associated with the nut, a ball race leading to the threads of the screw, a gear wheel on the screw operating above the nut, a post projecting from the upper surface of the nut, a post depending from the gear wheel, the said post on the gear wheel adapted to engage the post projecting from the nut, for arresting the downward movement of the screw.

2. In a lifting jack, a base member, a jacket operating on the base member, a nut carrying a head supported by the base, a screw associated with the nut, a gear on the upper portion of the screw, anti-friction devices between the threads of the nut and screw, means for operating the screw, a brake for controlling the movement of the screw operating means, means adapted to co-act with means on the nut for arresting the downward movement of the screw.

3. In a lifting jack, a base, a nut supported thereby, a screw threaded in the nut, a gear wheel mounted on the screw, a post on the nut, a depending post on the gear wheel, the said posts being adapted to co-act to limit the rotation of the screw in one direction, a post projecting laterally from the screw near the bottom thereof, and a member projecting into the path of travel of the last mentioned post for arresting the rotation of the screw at the limit of its upward movement, and means for rotating the screw.

4. In a lifting jack, a base having a casing, a nut in said casing, a screw threaded in the nut, a head mounted to take motion from the screw, a gear wheel mounted on the screw for rotating the same in the nut, a post projecting from the upper edge of the nut, a post projecting from the gear wheel adapted to engage the post projecting from the nut for arresting the rotation of the screw, a post projecting radially from the casing, a post projecting from the screw adapted to engage the post projecting from the casing to arrest the rotation of the screw at the limit of its upward movement, and means for rotating the gear wheel.

5. In a lifting jack, a base having a casing, a nut supported in the casing, a screw threaded in the nut, a gear wheel on the screw, a shaft having a pinion meshing with the gear wheel, a worm wheel rotatable on the shaft, a ratchet wheel keyed to the said shaft, pawls pivoted to the worm wheel adapted to engage the teeth of the ratchet wheel, a worm in engagement with the worm wheel, means for communicating motion to the worm wheel, and a brake in engagement with the worm having means for adjusting the said brake to control the rotation of the worm.

6. In a lifting jack, a base having a casing, a nut supported in the casing, a screw threaded in the nut, a gear wheel on the screw, a shaft having a pinion meshing with the gear wheel, means for supporting the shaft, a worm wheel rotatable on the shaft, a ratchet wheel secured to the shaft, pawls pivoted to the worm wheel and adapted to engage the teeth of the ratchet wheel, a worm in engagement with said worm wheel, an operating wheel having a shank, means for locking the shank of the wheel and the worm together, and a braking mechanism associated with and operative on the said worm.

7. In a lifting jack, a base having a casing, a nut supported in the casing, a screw threaded in the nut, a gear wheel on the screw, a shaft having a pinion meshing with the gear wheel, a gear wheel concentric with the shaft and rotatable with respect thereto, a ratchet wheel attached to the shaft, pawls pivoted to the last named gear wheel and adapted to engage the teeth of the ratchet wheel, a worm driven from said last named gear wheel and an adjustable brake for said worm.

8. In a lifting jack, a base having a casing, a nut supported in the casing, a screw threaded in the nut, a gear wheel on the screw, a driving means for said gear wheel comprising a shaft, a pinion driven by said shaft and meshing with the gear wheel, a gear wheel concentric with the shaft and rotatable with respect thereto, a ratchet wheel attached to the shaft, pawls pivoted to the last named gear wheel and adapted to engage the teeth of the ratchet wheel, a worm driven from said last named gear wheel, and an adjustable brake for said worm.

In testimony whereof, I hereunto affix my signature in the presence of two witnesses.

CALVIN T. STARBUCK.

Witnesses:
T. M. BRADLEY, Jr.,
L. J. HALEY, Jr.